United States Patent [19]

Schonstedt

[11] 4,163,877

[45] Aug. 7, 1979

[54] HOUSING FOR CIRCUITRY AND LOUDSPEAKER OF A MAGNETIC LOCATOR SHIELDS AND RESILIENTLY MOUNTS THE LOUDSPEAKER

[75] Inventor: Erick O. Schonstedt, Reston, Va.

[73] Assignee: Schonstedt Instrument Company, Reston, Va.

[21] Appl. No.: 868,723

[22] Filed: Jan. 11, 1978

[51] Int. Cl.² ........................................... H04R 1/102
[52] U.S. Cl. ................................ 179/146 E; 179/179; 179/184
[58] Field of Search ................... 179/1 E, 146 E, 179, 179/184; 181/148, 149, 152, 155, 171, 195

[56] References Cited

U.S. PATENT DOCUMENTS

| | | | |
|---|---|---|---|
| 2,738,419 | 3/1956 | Harasek | 181/148 |
| 3,987,258 | 10/1976 | Tsutsui et al. | 179/179 |

FOREIGN PATENT DOCUMENTS 1077151 11/1954 France ..................................... 181/155

Primary Examiner—George G. Stellar
Attorney, Agent, or Firm—Shapiro and Shapiro

[57] ABSTRACT

A magnetic locator employs a loudspeaker to produce an audible signal which indicates detection of a magnetic object. The loudspeaker is mounted on a frame in a housing and is spring biased against an end wall of a cover part of the housing. Openings through the housing wall for passage of sound are protected by a shield which, together with a plateau on the exterior of the housing wall, provides an annular space for omnidirectional radiation of acoustic energy. Mounting screws for the loudspeaker project from the frame through holes in the housing wall and receive nuts for securing the cover part of the housing to the frame. When the cover part is secured to the frame, elastomeric washers on the screws inside the housing are positioned automatically, and biasing springs on the screws are partially compressed.

9 Claims, 3 Drawing Figures

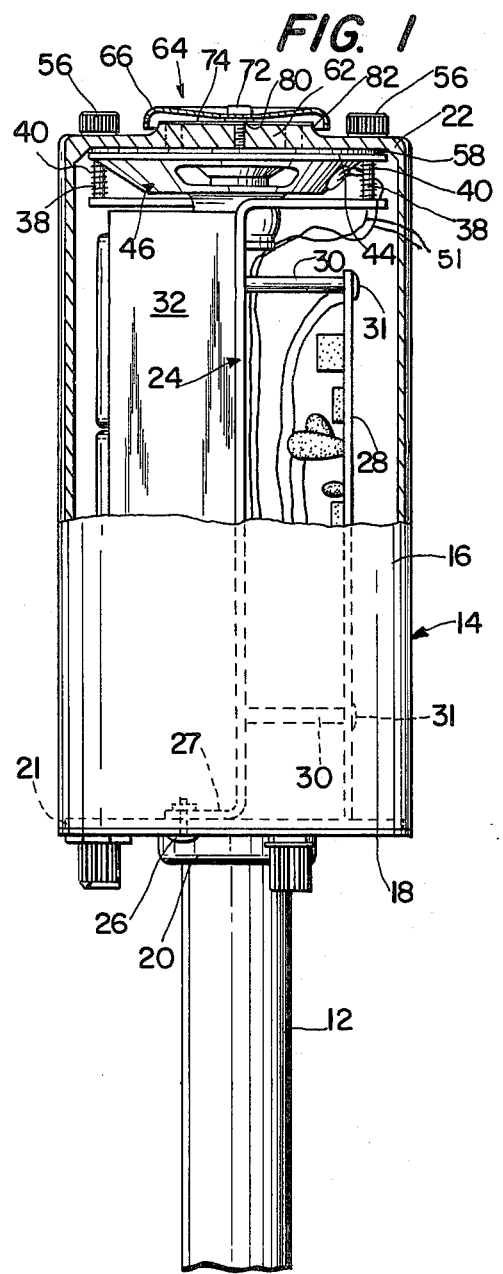

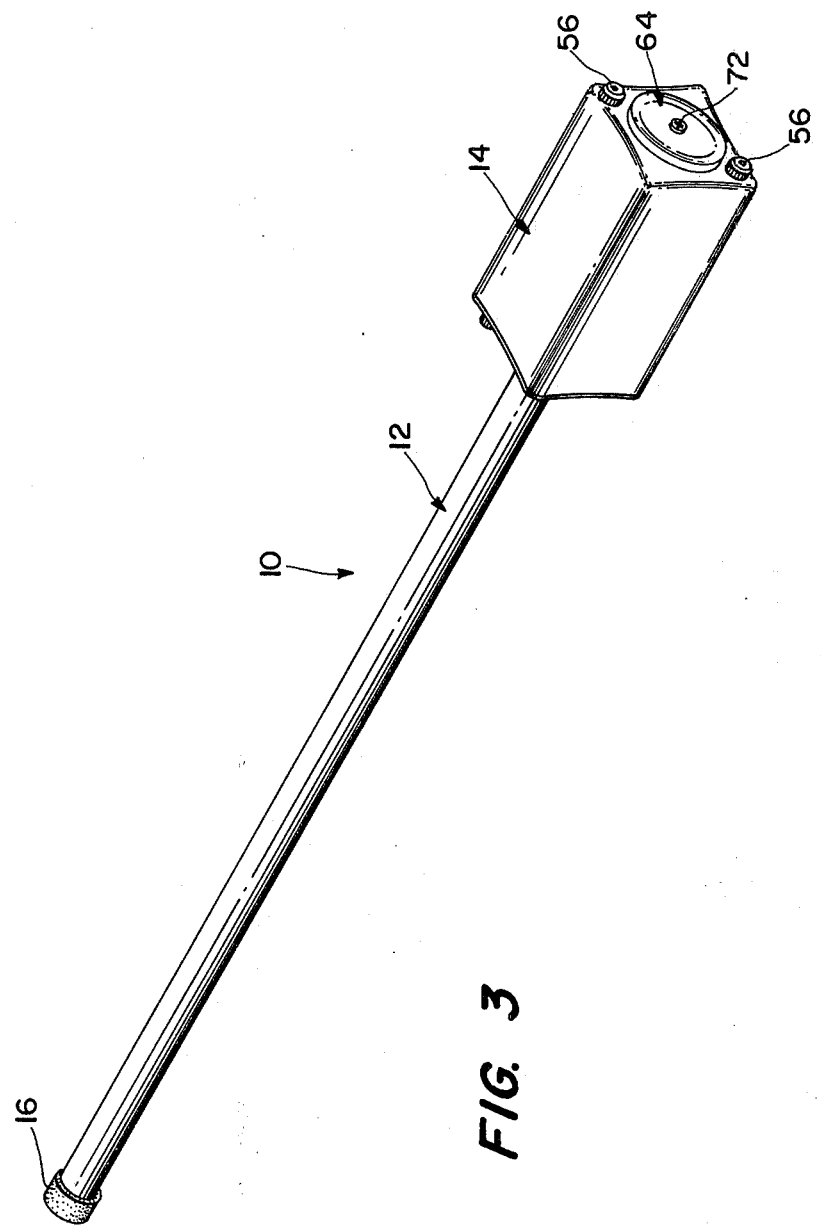

HOUSING FOR CIRCUITRY AND LOUDSPEAKER OF A MAGNETIC LOCATOR SHIELDS AND RESILIENTLY MOUNTS THE LOUDSPEAKER

BACKGROUND OF THE INVENTION

This invention relates to apparatus for detecting magnetic phenomena and is more particularly concerned with an improved magnetic locator.

Devices for locating magnetic objects and/or for detecting or measuring magnetic fields are well known. Such devices may comprise a plurality of magnetic sensor units, including appropriate windings or coils, which are spaced apart and mounted within a non-magnetic tubular housing. See, for example, U.S Pat. No. 3,894,283, granted July 8, 1975, and assigned to the same assignee as the present invention, incorporated herein by reference. The external configuration of the apparatus described in that patent resembles a broomstick with a can at one end thereof. The "broomstick" is actually an elongated tubular housing, and the "can" is a tubular housing of larger diameter fixed to one end of the broomstick. The exemplary structure described in the patent employs earphones connected to electronics in the "can" to produce audible signals indicative of detected magnetic objects. It is well known in the prior art of metal detectors to employ a loudspeaker to produce audio signals, but prior metal detectors with loudspeakers have left much to be desired.

When earphones are employed in a magnetic locator, it is a simple matter to provide a phone jack at a convenient location on a fixed portion of the can which houses the electronics. However, providing a loudspeaker in a magnetic locator is not a simple matter. First of all, to protect the loudspeaker, it should be mounted in a housing, preferably, for simplicity, the same housing containing the electronics of the locator. Openings must then be provided in the housing for the passage of sound from the loudspeaker to the exterior of the housing, but rain entering the housing through the openings can damage the loudspeaker and other components in the housing. Access to the interior of the housing must be provided for the replacement of batteries or other maintenance, and the mounting of the loudspeaker should not impede such access. Also, since conventional loudspeakers usually have magnetic parts, the magnetic effect of the loudspeaker must be balanced out or compensated so that the locator will operate properly, and compensation should not change once it is properly set by the manufacturer of the locator. Furthermore, since magnetic locators are frequently subjected to rough use, the loudspeaker mounting arrangement should be capable of handling shock forces without damage to the loudspeaker.

SUMMARY OF THE INVENTION

It is accordingly a principal object of the present invention to provide improved apparatus for detecting magnetic phenomena and especially for locating magnetic objects.

A further object of the invention is to provide an improved magnetic locator having a loudspeaker for producing an audible output signal.

Another object of the invention is to provide, in magnetic locator apparatus and the like, an improved arrangement for mounting a loudspeaker and an improved arrangement for transmitting sound from the loudspeaker while shielding the loudspeaker from rain.

Briefly stated, in one of its broader aspects, the present invention is employed in magnetic detector apparatus of the type having magnetic sensor means, having circuit means for producing an electrical output from said sensor means, and having a housing for said circuit means, and resides in the improvement comprising means supporting a loudspeaker in said housing adjacent to a wall of said housing for producing an audible signal from said electrical output, opening means in said wall for transmitting sound from said loudspeaker to the exterior of said housing, and a shield covering said opening means but providing space for the radiation of sound waves from said loudspeaker.

BRIEF DESCRIPTION OF THE DRAWINGS

The invention will be further described in conjunction with the accompanying drawings, which illustrate a preferred and exemplary embodiment, and wherein:

FIG. 1 is a fragmentary side elevation view, partly broken away and in section, showing the improvement of the invention;

FIG. 2 is a fragmentary exploded perspective view illustrating the invention in greater detail; and FIG. 3 is a perspective view showing an entire magnetic locator incorporating the invention.

DETAILED DESCRIPTION OF THE INVENTION

Referring to the drawings, and initially to FIG. 3, a magnetic locator 10 in accordance with the invention may comprise an elongated tubular housing 12 connected to a housing 14 of larger cross-dimensions. Housing 12 is formed of non-magnetic material, such as aluminum, and preferably contains a pair of spaced, aligned flux-gate magnetic sensors (not shown), which may be constructed, supported, and excited as set forth in the aforesaid U.S. Pat. No. 3,894,283, for example. Housing 14, which may be formed of aluminum also, contains the electronics for exciting the sensors and for processing signals from the sensors. In use, the locator may be grasped at a portion of housing 12 near housing 14, and the tip 16 of housing 12 may be swept along the ground to detect a buried magnetic object, for example. An audible signal indicative of the detection of magnetic objects is produced by a loudspeaker as described hereinafter.

As shown in FIG. 1, an end wall plate 18 of housing 14 is fixed to an end of housing 12 by means of a supporting collar 20, through which electrical leads (not shown) extend to the magnetic sensors from electronics in housing 14. The remainder of housing 14 is preferably a deep cup 16 of generally square cross-section (see FIG. 2) forming a cover part of housing 14. End wall 18 is preferably undercut about its periphery to provide a peripheral step 21 which receives the open end of cup 16. The opposite end of cup 16 is closed by end wall 22.

A frame 24 is mounted on plate 18 by means of screws or other fasteners 26 passing through foot portions 27 of the frame. A circuit board 28 may be mounted upon one side of frame 24 by means of spacer elements 30 and screws 31 or other fastener elements. The opposite side of frame 24 may support a battery case 32. The details of the electronics for exciting the magnetic sensors in housing 12 and for producing an electrical output signal which indicates the presence of a magnetic object, for example, are not pertinent to the present invention.

Reference may be made to the prior art, including the aforesaid U.S. Pat. No. 3,894,283, for further information in this regard.

Frame 24, which may be of generally rectangular configuration, has a pair of oppositely extending arms 34 and 36 adjacent to end wall 22 of housing 14. Each arm has affixed thereto and projecting therefrom a screw 38. A coil compression spring 40 is fitted loosely over each screw 38. The screws project through corresponding openings 42 in a marginal portion of the frame 44 of a loudspeaker 46. The loudspeaker may be of the conventional type having a permanent magnet 48 receiving a voice coil (not shown) affixed to the center portion of a cone 50, the periphery of which is attached to frame 44 of the speaker. Wires 51 connect the voice coil of the speaker to the circuit on board 28. Elastomeric washers 52, such as O-rings, are fitted onto the projecting ends of screws 38 and grip the screws resiliently. The screws then project through holes 54 in end wall 22 to receive nuts 56.

If the springs 40, the loudspeaker 46, and the washers 52 are placed on the screws 38, with the washers positioned near the free ends of the screws, and if the cup 16 is then mated with plate 18 as shown in FIG. 1, end wall 22 will bear upon washers 52 and force them to assume a position on screws 38 at which springs 40 are partially compressed. The resilient grip of the washers with the screw is sufficient to limit movement of loudspeaker 46 on the screws 38 away from frame 24 even if cup 16 is later removed. The side of frame 44 of the speaker that is engaged by washers 52 may be dished somewhat so that the washers 52 are recessed in frame 44 when cup 16 is removed. A circular rim 58 surrounding the speaker cone 50 and fixed to frame 44 may constitute the surface of the speaker that engages the underside of the wall 22 when cup 16 is assembled with plate 18 as shown in FIG. 1. Until the nuts 56 are threaded down onto the exposed ends of screws 38, cup 16 will be held slightly away from plate 18 by the biasing action of springs 40, but as the nuts 56 are tightened, the open end of cup 16 will become seated in the peripheral step 21 of plate 18.

It is apparent from the foregoing description of the mounting arrangement for the loudspeaker 46 that the loudspeaker does not impede access to the interior of housing 14 and that the speaker is held snugly against the wall 22 resiliently, so that the speaker may move under the influence of shock forces but yet will always seat itself against wall 22 in the same position in the housing 14. Thus, once the magnetic effect of the speaker is balanced out or compensated by an adjustment in the magnetic sensor circuit (as by adjusting a potentiometer, not shown) the position of the speaker will not shift and disturb that adjustment.

Holes 60 in end wall 22 of housing 14 are provided for the transmission of sound from the loudspeaker to the exterior of the housing. The holes are preferably formed in a plateau 62 extending outwardly from end wall 22. In the preferred form, the plateau has a circular outline, and four holes 60 are provided at successive locations spaced 90° about the circumference of the plateau.

A shield 64 is employed to prevent rain from entering holes 60. As shown, the shield is preferably a disk with a peripheral lip 66 smoothly curved from the main body 68 of the disk and extending in the direction of end wall 22. The main body of the disk is depressed in the direction of the plateau to provide a shallow, conical depression with a flat center region having a hole 70 therethrough for receiving a mounting screw 72.

A perforated disk 74 is interposed between shield 64 and plateau 62. Disk 74, having a center hole 76 through which screw 72 passes, fits flush with plateau 62 as shown in FIG. 1. Screw 72 is threaded into a central hole 78 of the plateau. A washer 80 serves to lift shield 64 off of the perforated disk 74. The perforations of disk 74 are much smaller in size than holes 60 and may be disposed evenly over the surface of disk 74. A screen is thus provided for the passage of sound while minimizing entry of water into holes 60.

As shown in FIG. 1, the lip 66 of shield 64 is spaced outwardly from the perimeter of plateau 62 to provide an annular opening for the radiation of sound waves omnidirectionally. The acoustic energy is guided to this annular opening by the expanding space between the center of shield 64 and plateau 62 and the outer regions of these elements. The curvature of the shield cross-section adjacent to lip 66 guides the sound waves smoothly toward the reversely curved peripheral surface 82 of plateau 62, from which the sound waves are projected outwardly in an omnidirectional pattern centered upon screw 72. Excellent sound transmission and dispersion characteristics are achieved by this arrangement, while shielding the loudspeaker from rain.

In a practical embodiment of the invention, the cover part 16 is about 6.445 inches long and 2.800 inches wide (on each side). The plateau 62 is about 1.600 inches in diameter (centered on the end wall 22) and projects about 0.125 inch from end wall 22. The curved peripheral surface 82 has a radius of curvature of about 0.125 inch. Holes 60 have a diameter of about 0.400 inch and are equally spaced on a 1 inch diameter circle. Shield 64 is formed of aluminum and has a diameter of about 1⅞ inch. The flat central portion of the shield has a diameter of about ½ inch. The total height of the shield is about ¼ inch, and the distance between the outer edge of lip 66 and the inner surface of the flat central portion of the shield is about 3/32 inch (measured along the axis of the shield). The shield has a thickness of about 0.050 inch. Screen 74 is formed of 22 gauge aluminum (0.025 inch) and has an outer diameter of about 1.600 inch. The perforations in the screen are 0.033 inch diameter holes distributed over the surface of the screen and occupying about 29% of the surface area of the screen.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. In magnetic detector apparatus of the type having magnetic sensor means, having circuit means for producing an electrical output from said sensor means, and having a housing for said circuit means, the improvement comprising means supporting a loudspeaker in said housing adjacent to a wall of said housing for producing an audible signal from said electrical output, opening means in said wall for transmitting sound from said loudspeaker to the exterior of said housing, and a shield covering said opening means but providing space for the radiation of sound waves from said loudspeaker, said wall being one end wall of a cover part of said housing that mates with another end wall of said housing having a frame fixed thereto, and said loudspeaker being resiliently supported on said frame by spring means biasing the loudspeaker against the interior of said one end wall.

2. Magnetic detector apparatus in accordance with claim 1, wherein said loudspeaker is supported on said frame by a pair of screws projecting from said frame through corresponding openings in a marginal portion of said loudspeaker, said spring means being coil springs surrounding said screws, respectively, between said frame and said marginal portion, and elastomeric washers fitted on projecting ends of said screws, the position of said washers on said screws being determined by engagement of said washers with said one end wall.

3. Magnetic detector apparatus in accordance with claim 2, wherein the projecting ends of said screws project through holes in said one end wall and receive nuts thereon for attaching said cover part to said frame.

4. In magnetic detector apparatus of the type having magnetic sensor means, having circuit means for producing an electrical output from said sensor means, and having a housing for said circuit means, the improvement comprising means supporting a loudspeaker in said housing adjacent to a wall of said housing for producing an audible signal from said electrical output, opening means in said wall for transmitting sound from said loudspeaker to the exterior of said housing, and a shield covering said opening means but providing space for the radiation of sound waves from said loudspeaker, said shield comprising a disk with a circumferential lip turned toward said wall, said wall having an external plateau surrounded by and spaced from said lip, the main body of said shield being depressed toward said plateau and the central portion of said shield being fastened to said plateau, said shield and said plateau defining therebetween a space that expands outwardly from the central portion of the shield to an annular opening between said lip and the periphery of the plateau.

5. Magnetic detector apparatus in accordance with claim 4, wherein the lip is smoothly curved from the main body of the shield and wherein the peripheral surface of the plateau is reversely curved to radiate sound omnidirectionally.

6. In magnetic detector apparatus of the type having magnetic sensor means, having circuit means for producing an electrical output from said sensor means, and having a housing for said circuit means, the improvement comprising means supporting a loudspeaker in said housing adjacent to a wall of said housing for producing an audible signal from said electrical output, opening means in said wall for transmitting sound from said loudspeaker to the exterior of said housing, and a shield covering said opening means but providing space for the radiation of sound waves from said loudspeaker, said shield comprising a disk with a circumferential lip turned toward said wall, said wall having an external plateau surrounded by and spaced from said lip, said opening means comprising a plurality of spaced holes through the plateau, a perforated disk being interposed between said plateau and said shield, the perforations of the perforated disk being much smaller in size than said holes.

7. In magnetic detector apparatus of the type having magnetic sensor means, having circuit means for producing an electrical output from said sensor means, and having a housing for said circuit means, the improvement comprising a loudspeaker in said housing adjacent to a wall of said housing for producing an audible signal from said electrical output, said loudspeaker being resiliently supported on a frame by spring means biasing the loudspeaker against the interior of said wall, said wall being one end wall of a cover part of said housing that mates with another end wall of said housing to which said frame is fixed, and means for transmitting sound from said loudspeaker to the exterior of said housing.

8. Magnetic detector apparatus in accordance with claim 7, wherein said loudspeaker is supported on said frame by a pair of screws projecting from said frame through corresponding openings in a marginal portion of said loudspeaker, said spring means being coil springs surrounding said screws, respectively, between said frame and said marginal portion, and elastomeric washers fitted on projecting ends of said screws, the position of said washers on said screws being determined by engagement of said washers with said one end wall.

9. Magnetic detector apparatus in accordance with claim 8, wherein the projecting ends of said screws project through holes in said one end wall and receive nuts thereon for attaching said cover part to said frame.

* * * * *